US012791894B2

(12) United States Patent
Sasaki et al.

(10) Patent No.: US 12,791,894 B2
(45) Date of Patent: Nov. 10, 2026

(54) LIQUID CRYSTAL DISPLAY DEVICE

(71) Applicant: Sharp Display Technology Corporation, Kameyama City (JP)

(72) Inventors: Takahiro Sasaki, Kameyama City (JP); Hiroyuki Hakoi, Kameyama City (JP); Atsuko Kanashima, Kameyama City (JP); Takashi Satoh, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 176 days.

(21) Appl. No.: 18/931,313

(22) Filed: Oct. 30, 2024

(65) Prior Publication Data

US 2025/0189842 A1 Jun. 12, 2025

(30) Foreign Application Priority Data

Dec. 12, 2023 (JP) ................................ 2023-209051

(51) Int. Cl.
*G02F 1/1335* (2006.01)
*G02F 1/1343* (2006.01)

(52) U.S. Cl.
CPC .. *G02F 1/133541* (2021.01); *G02F 1/133553* (2013.01); *G02F 1/13439* (2013.01); *G02F 2203/09* (2013.01)

(58) Field of Classification Search
CPC ......... G02F 1/133541; G02F 1/133553; G02F 1/13439; G02F 2203/09
USPC .......................................................... 349/114
See application file for complete search history.

(56) References Cited

U.S. PATENT DOCUMENTS

| | | | |
|---|---|---|---|
| 8,692,758 | B2 | 4/2014 | Matsuda et al. |
| 2010/0295841 | A1 | 11/2010 | Matsuda et al. |
| 2013/0320334 | A1 | 12/2013 | Yamazaki et al. |
| 2021/0181576 | A1 | 6/2021 | Sasaki et al. |

FOREIGN PATENT DOCUMENTS

| | | | |
|---|---|---|---|
| JP | 3394926 B2 | 4/2003 | |
| JP | 5036864 B2 | 9/2012 | |
| JP | 2014-007399 A | 1/2014 | |
| JP | 2021-096461 A | 6/2021 | |

*Primary Examiner* — David Y Chung
(74) *Attorney, Agent, or Firm* — ScienBiziP, P.C.

(57) ABSTRACT

A pixel electrode of a liquid crystal display device includes at least one unit pixel electrode on which a liquid crystal domain is formed, and each pixel includes a unit pixel corresponding to the unit pixel electrode. The unit pixel includes a reflective region and a transmissive region smaller than the reflective region. An outer edge of the unit pixel electrode includes a first and a second electrode sides. The liquid crystal layer is a negative type, and a distance from the second electrode side to the transmissive region is smaller than a distance from the first electrode side to the transmissive region, or the liquid crystal layer is a positive type, and a distance from the first electrode side to the transmissive region is smaller than a distance from the second electrode side to the transmissive region.

8 Claims, 27 Drawing Sheets

LIQUID CRYSTAL DISPLAY DEVICE

CROSS-REFERENCE TO RELATED APPLICATIONS

This application claims the benefit of priority to Japanese Patent Application Number 2023-209051 filed on Dec. 12, 2023. The entire contents of the above-identified application are hereby incorporated by reference.

BACKGROUND

Technical Field

The disclosure relates to a liquid crystal display device, and particularly relates to a transflective liquid crystal display device in which each pixel includes a reflective region and a transmissive region.

In recent years, as a display device for a smart watch or a digital signage for outdoor advertisement, a transflective (also referred to as "transmissive/reflective") liquid crystal display device (LCD) has been used. The transflective LCD includes the reflective region for display (reflective display) in a reflection mode, and the transmissive region for display (transmissive display) in a transmission mode in one pixel. Thus, high viewability in an outdoor environment under sunlight can be obtained by the reflective display using external light, and information can be checked at night by the transmissive display using a backlight. An example of the transflective LCD is disclosed in JP 2021-96461 A.

SUMMARY

As a result of detailed studies on the transflective LCD, the inventor of the present application has found that in the transflective LCD including a circular polarizer as a polarizer and a liquid crystal layer having a monodomain alignment, flickers observed only from an oblique direction occur during the transmissive display. These flickers are not observed from a front direction.

In recent years, there has been an increasing demand for display quality, and thus it is desirable to suppress the above-described flickers. In addition, when low-frequency driving (for example, 0.5 Hz driving or the like) is performed for low power consumption, flickers are easily observed. Thus, from the viewpoint of performing the low-frequency driving, it is preferable that the above-described flickers are suppressed.

Embodiments of the disclosure have been made in view of the problems described above, and an object of the disclosure is to improve display quality of the transflective liquid crystal display device including the circular polarizer and the liquid crystal layer having the monodomain alignment.

The present specification discloses a liquid crystal display device according to the following items.

Item 1

A liquid crystal display device including:

a first substrate;

a second substrate facing the first substrate;

a liquid crystal layer provided between the first substrate and the second substrate;

a pair of circular polarizers facing each other with at least the liquid crystal layer interposed therebetween, and a plurality of pixels arranged in a matrix, wherein the first substrate includes a pixel electrode provided in each of the plurality of pixels, the liquid crystal layer has a monodomain alignment in which at least one liquid crystal domain of one type is formed in each of the plurality of pixels when a voltage is applied to the liquid crystal layer, the pixel electrode includes at least one unit pixel electrode on which the liquid crystal domain is formed, each of the plurality of pixels includes at least one unit pixel that is a region corresponding to the at least one unit pixel electrode, the unit pixel includes a reflective region performing display in a reflection mode and a transmissive region performing display in a transmission mode and having an area smaller than an area of the reflective region in a plan view, and an outer edge of the unit pixel electrode includes at least one first electrode side and at least one second electrode side, when a direction of a director of the liquid crystal domain is referred to as a reference alignment direction, a direction orthogonal to the first electrode side and directed toward the inside of the unit pixel electrode forms an angle of more than 90° with the reference alignment direction, a direction orthogonal to the second electrode side and directed toward the inside of the unit pixel electrode forms an angle of less than 90° with the reference alignment direction, and the liquid crystal layer is made of a negative liquid crystal material, and in the unit pixel, a distance from the second electrode side to the transmissive region is smaller than a distance from the first electrode side to the transmissive region, or the liquid crystal layer is made of a positive liquid crystal material, and in the unit pixel, a distance from the first electrode side to the transmissive region is smaller than a distance from the second electrode side to the transmissive region.

Item 2

A liquid crystal display device including:

a first substrate;

a second substrate facing the first substrate;

a liquid crystal layer provided between the first substrate and the second substrate;

a pair of circular polarizers facing each other with at least the liquid crystal layer interposed therebetween, and a plurality of pixels arranged in a matrix, wherein the first substrate includes a pixel electrode provided in each of the plurality of pixels, the liquid crystal layer has a monodomain alignment in which at least one liquid crystal domain of one type is formed in each of the plurality of pixels when a voltage is applied to the liquid crystal layer, the pixel electrode includes at least one unit pixel electrode on which the liquid crystal domain is formed, each of the plurality of pixels includes at least one unit pixel that is a region corresponding to the at least one unit pixel electrode, and the unit pixel includes a reflective region performing display in a reflection mode and a transmissive region performing display in a transmission mode and having an area smaller than an area of the reflective region in a plan view, when a direction of a director of the liquid crystal domain is referred to as a reference alignment direction, the liquid crystal layer is made of a negative liquid crystal material, and in the unit pixel, the transmissive region is disposed to be shifted to a side opposite to the reference alignment direction with respect to a center of the unit pixel, or the liquid crystal layer is made of a positive liquid crystal material, and in the unit pixel, the transmissive region is disposed to be shifted to a side of the reference alignment direction with respect to a center of the unit pixel.

Item 3

The liquid crystal display device according to item 1 or 2, wherein the liquid crystal display device may be driven at a drive frequency of 30 Hz or less.

Item 4

The liquid crystal display device according to any one of items 1 to 3, wherein a thickness of the liquid crystal layer in the reflective region and a thickness of the liquid crystal layer in the transmissive region are substantially the same in each of the plurality of pixels.

Item 5

The liquid crystal display device according to any one of items 1 to 3, wherein the liquid crystal layer does not have a twist alignment, and a thickness of the liquid crystal layer in the transmissive region is larger than a thickness of the liquid crystal layer in the reflective region in each of the plurality of pixels.

Item 6

The liquid crystal display device according to item 5, wherein the plurality of pixels include a red pixel that displays red, a green pixel that displays green, and a blue pixel that displays blue, and a thickness of the liquid crystal layer in at least one of the red pixel, the green pixel, or the blue pixel is different from a thickness of the liquid crystal layer in at least one of the others.

Item 7

The liquid crystal display device according to any one of items 1 to 6, further including:

memory circuits connected to the plurality of pixels, respectively.

Item 8

The liquid crystal display device according to any one of items 1 to 7, wherein the transmissive region has a shape substantially similar to a shape of the unit pixel in a plan view in each of the at least one unit pixel.

According to embodiments of the present disclosure, display quality of the transflective liquid crystal display device including the circular polarizer and the liquid crystal layer having the monodomain alignment can be improved.

BRIEF DESCRIPTION OF DRAWINGS

The disclosure will be described with reference to the accompanying drawings, wherein like numbers reference like elements.

DESCRIPTION OF EMBODIMENTS

Hereinafter, embodiments of the disclosure will be described with reference to the accompanying drawings. Note that the disclosure is not limited to the embodiments described below.

First Embodiment

Figure 1:
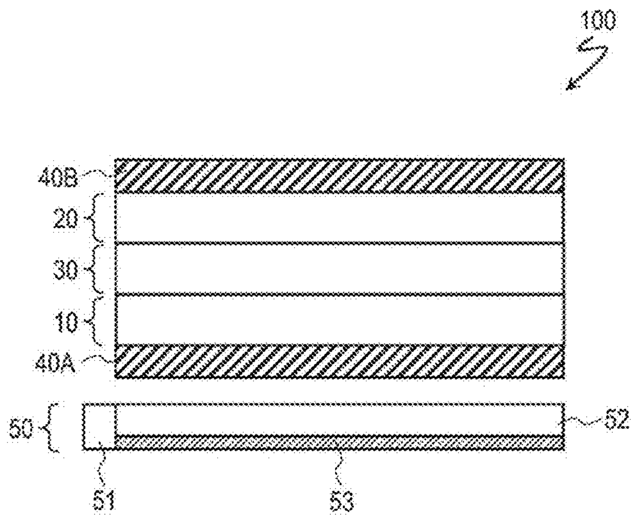
FIG. 1 is a cross-sectional view schematically illustrating a liquid crystal display device 100 according to an embodiment of the disclosure.
Figure 2:
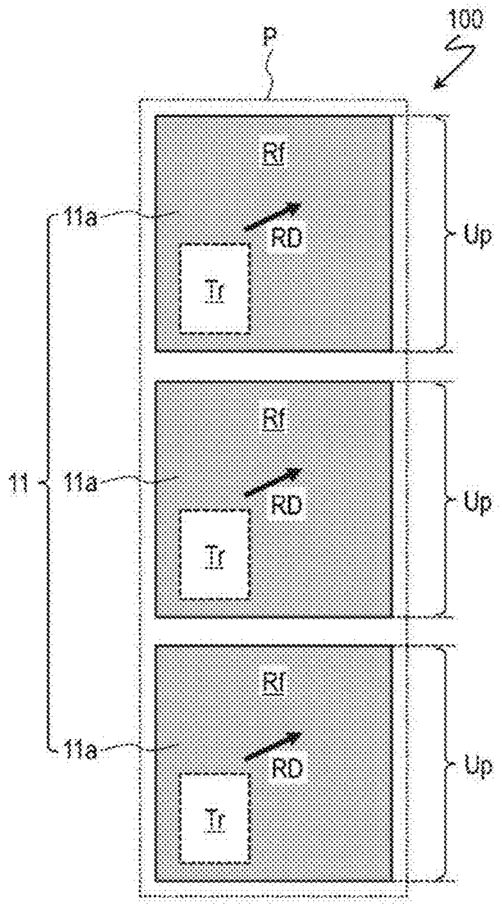
FIG. 2 is a plan view schematically illustrating the liquid crystal display device 100 and illustrates regions corresponding to one pixel P in the liquid crystal display device 100.

A liquid crystal display device 100 according to the present embodiment will be described with reference to FIGS. 1 and 2. The liquid crystal display device 100 of the present embodiment is a transflective (transmissive/reflective) liquid crystal display device. FIG. 1 is a cross-sectional view schematically illustrating the liquid crystal display device 100. FIG. 2 is a plan view illustrating regions corresponding to one pixel P in the liquid crystal display device 100.

As illustrated in FIG. 1, the liquid crystal display device 100 includes a TFT substrate (first substrate) 10, a counter substrate (second substrate) 20 facing the TFT substrate 10, and a liquid crystal layer 30 provided between the TFT substrate 10 and the counter substrate 20. The TFT substrate 10 is located on a back side (that is, on a side opposite to an observer) of the liquid crystal layer 30, and the counter substrate 20 is located on a front side (that is, on a side of the observer) of the liquid crystal layer 30.

The liquid crystal display device 100 includes a pair of circular polarizers 40A and 40B. The pair of circular polarizers 40A and 40B face each other with at least the liquid crystal layer 30 interposed therebetween. In the illustrated example, one (herein after, referred to as a "back circular polarizer") 40A of the pair of circular polarizers 40A and 40B is disposed on the back face side of the TFT substrate 10, and the other (herein after, referred to as a "front circular polarizer") 40B is disposed on the front side of the counter substrate 20. Each of the back circular polarizer 40A and the front circular polarizer 40B may be a circular polarizer of various known types. For example, the back circular polarizer 40A may be a combination of a linear polarizer and a retarder located between the linear polarizer and the TFT substrate 10. In addition, for example, the front circular polarizer 40B may be a combination of a linear polarizer and a retarder located between the linear polarizer and the counter substrate 20.

The liquid crystal display device 100 further includes an illumination device (backlight) 50. The illumination device 50 is disposed on the back face side of the back circular polarizer 40A. In the illustrated example, the illumination device 50 includes a light source (for example, an LED) 51 that emits light, a light guide plate 52 that guides the light from the light source 51 toward the back circular polarizer 40A side, and a reflector 53 disposed on the back face side of the light guide plate 52. The illumination device 50 may further include a prism sheet and a diffuser sheet disposed on the front face side (or back face side) of the light guide plate 52.

The liquid crystal display device 100 includes a plurality of the pixels P arranged in a matrix. The plurality of pixels P typically include red pixels that display red, green pixels that display green, and blue pixels that display blue. FIG. 2 illustrates one pixel P among the plurality of pixels P in the liquid crystal display device 100. The TFT substrate 10 includes a pixel electrode 11 provided in each pixel P.

When a voltage is applied to the liquid crystal layer 30, the liquid crystal layer 30 has a monodomain alignment. That is, when the voltage is applied to the liquid crystal layer 30, at least one liquid crystal domain of one type is formed in each pixel P. Here, three liquid crystal domains of one type are formed in each pixel P. FIG. 2 illustrates a direction (hereinafter, may be referred to as a "reference alignment direction") RD of a director of each liquid crystal domain. The direction RD of the director is a tilt direction of a liquid crystal molecule near the center of the liquid crystal layer 30 in the thickness direction when a voltage is applied. Here, the tilt direction is an azimuth angle direction. An azimuth angle direction is measured with reference to a horizontal direction in the display surface, and a counterclockwise rotation is a positive rotation (when the display surface is compared to a clock face, a three o'clock direction is denoted as an azimuth angle of 0°, and a counterclockwise rotation represents a positive rotation).

The pixel electrode 11 includes at least one unit pixel electrode 11*a* on which a liquid crystal domain is formed. Here, the pixel electrode 11 includes three unit pixel electrodes 11*a*. When the pixel electrode 11 includes a plurality of the unit pixel electrodes 11*a*, each unit pixel electrode 11*a* may be referred to as a "subpixel electrode".

Each pixel P includes at least one unit pixel Up that is a region corresponding to the at least one unit pixel electrode 11*a*. Here, each pixel P includes three unit pixels Up. When the pixel P includes a plurality of the unit pixels Up, each unit pixel Up may be referred to as a "subpixel".

The unit pixel Up includes a reflective region Rf for display in a reflection mode, and a transmissive region Tr for display in a transmission mode. The transmissive region Tr has an area smaller than an area of the reflective region Rf in a plan view. A ratio of the area of the transmissive region Tr occupying the pixel P may be appropriately set depending on an application and the like, and is not particularly limited, but is, for example, from 10% to less than 50%.

Figure 3:
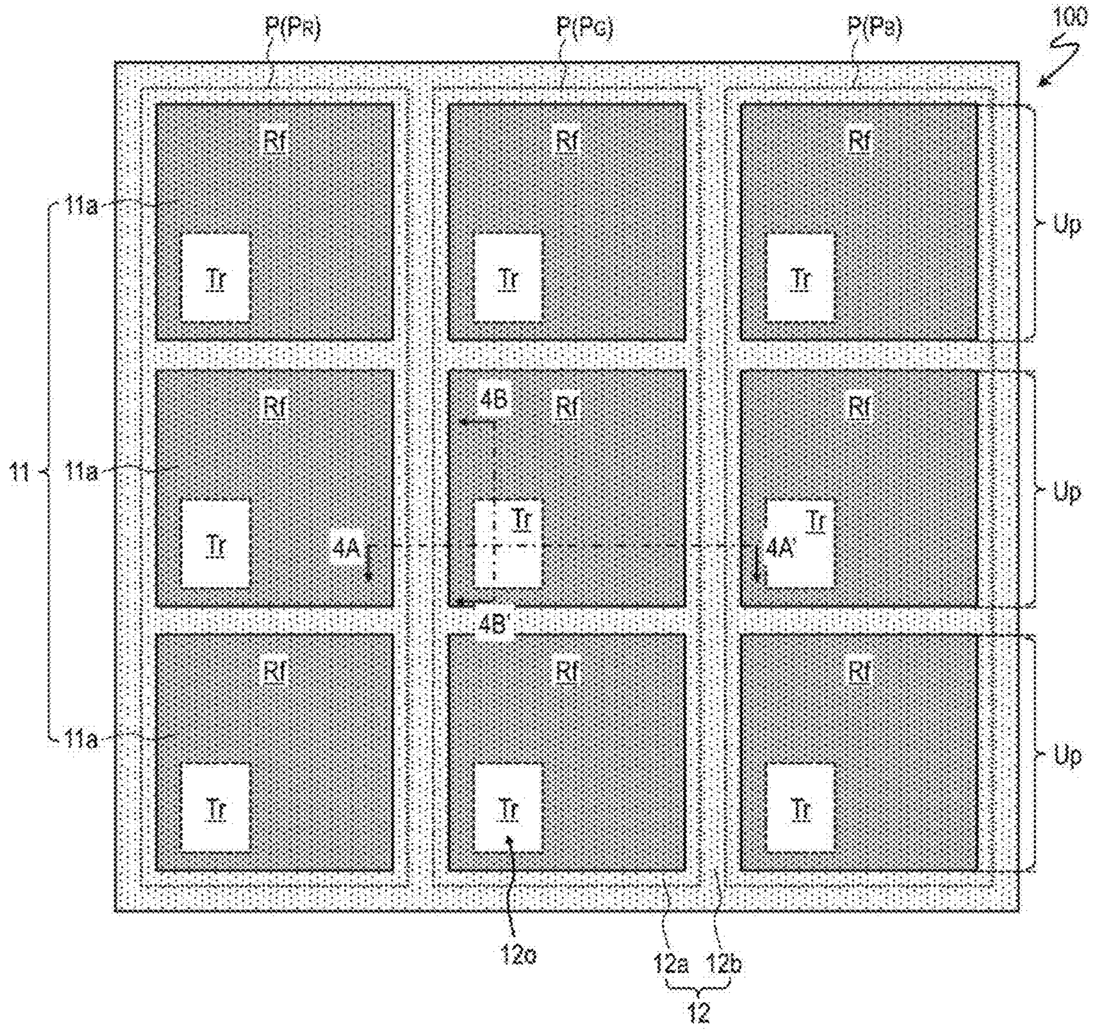
FIG. 3 is a plan view schematically illustrating the liquid crystal display device 100 and illustrates regions corresponding to three pixels P (red pixel PR, green pixel PG, and blue pixel PB) in the liquid crystal display device 100.
Figure 4A:
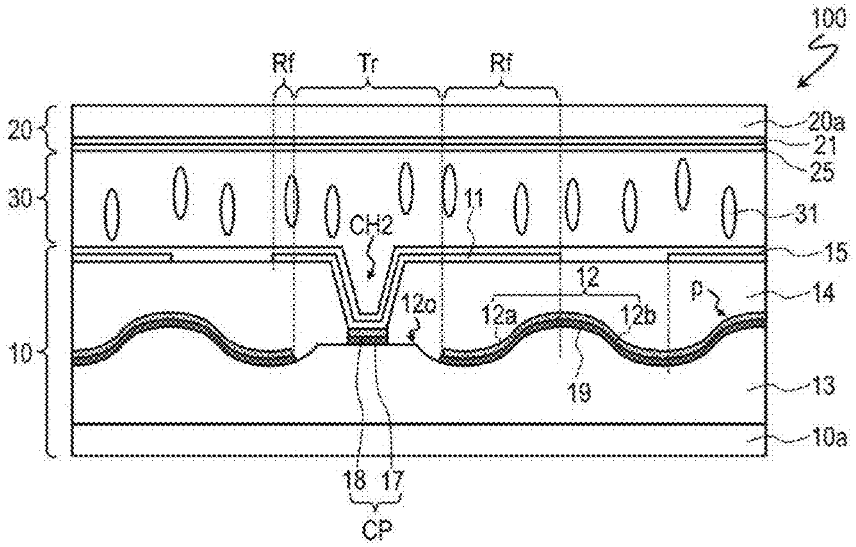
FIG. 4A is a cross-sectional view schematically illustrating the liquid crystal display device 100 and illustrates a cross-sectional configuration taken along a line 4A-4A' in FIG. 3.
Figure 4B:
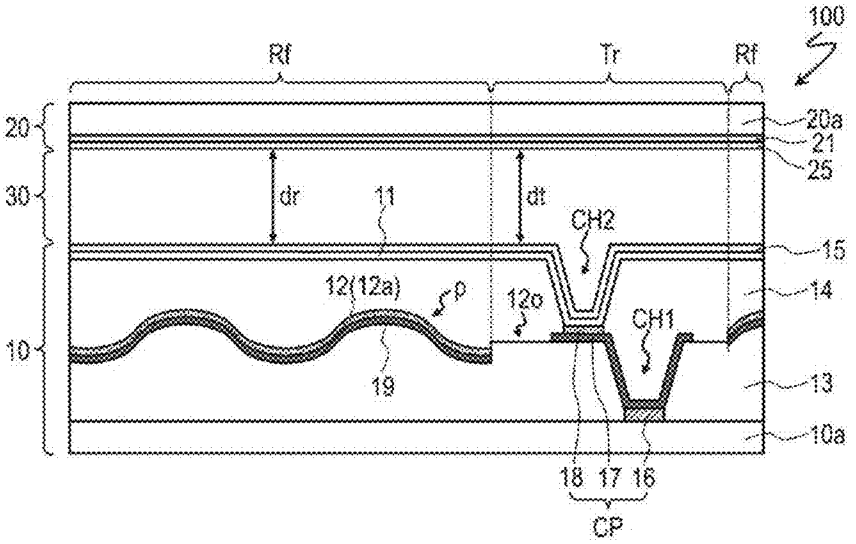
FIG. 4B is a cross-sectional view schematically illustrating the liquid crystal display device 100 and illustrates a cross-sectional configuration taken along a line 4B-4B' in FIG. 3.

Here, a configuration of the liquid crystal display device 100 will be further described more specifically with reference to FIG. 3, FIG. 4A, and FIG. 4B. FIG. 3 is a plan view illustrating regions corresponding to three pixels P (red pixel PR, green pixel PG, and blue pixel PB) in the liquid crystal display device 100. FIG. 4A, and FIG. 4B are cross-sectional views taken along a line 4A-4A' and a line 4B-4B', respectively, in FIG. 3.

The TFT substrate 10 includes the pixel electrode 11 provided to each of the plurality of pixels P, and a reflective layer 12 located on a side opposite to the liquid crystal layer 30 with respect to the pixel electrode 11 (in other words, more toward a back face side than the pixel electrode 11). The TFT substrate 10 further includes a first interlayer insulating layer 13, a second interlayer insulating layer 14, a contact portion CP, and a first alignment film 15.

The constituent elements of the TFT substrate 10 (the pixel electrode 11 and the like described above) are supported by a substrate 10*a*. The substrate 10*a* is, for example, a glass substrate or a plastic substrate.

A circuit (backplane circuit) (not illustrated) for driving pixels P is formed on the substrate 10*a*. Here, the backplane circuit has a memory circuit (SRAM for example) connected to each of the plurality of pixels P. A liquid crystal display device in which the memory circuit is provided for each pixel P may be referred to as a "memory liquid crystal". Specific configurations of a memory liquid crystal are disclosed in, for example, JP 5036864 B (corresponding to U.S. Pat. No. 8,692,758). The entire disclosures of JP 5036864 B and U.S. Pat. No. 8,692,758 are incorporated herein by reference.

The first interlayer insulating layer 13 is provided to cover the backplane circuit. The first interlayer insulating layer 13 has a surface with an uneven shape. Thus, the first interlayer insulating layer 13 has an uneven surface structure. The first interlayer insulating layer 13 having the uneven surface structure may be formed by using a photosensitive resin, as described, for example, in JP 3394926 B.

The reflective layer 12 is provided on the first interlayer insulating layer 13. The reflective layer 12 is formed from a metal material with high reflectance. Here, a silver alloy is used as the metal material for forming the reflective layer 12, but the disclosure is not limited to this, and for example, aluminum or an aluminum alloy may be used. The surface of the reflective layer 12 has an uneven shape corresponding to the uneven surface structure of the first interlayer insulating layer 13. That is, the reflective layer 12 also has an uneven surface structure. The uneven surface structure of the reflective layer 12 is provided to diffusely reflect ambient light to achieve display similar to paper white. The uneven surface structure can, for example, be constituted by a plurality of protruding portions p arranged randomly such that a center-to-center spacing between adjacent protruding portions p is from 5 μm to 50 μm, and preferably from 10 μm to 20 μm. When viewed from the normal direction of the substrate 10*a*, the shapes of the protruding portions p are substantially circular or substantially polygonal. An area of the protruding portions p occupying the pixel P is, for example, from approximately 20% to 40%. A height of the protruding portions p is from 1 μm to 5 μm, for example.

The reflective layer 12 includes a first region 12*a* located within each of the plurality of pixels P and a second region 12*b* located between any two pixels P adjacent to each other. The uneven surface structure of the reflective layer 12 is formed in each of the first region 12*a* and the second region 12*b*. Thus, not only the first region 12*a* but also the second region 12*b* has the uneven surface structure. The reflective layer 12 of the TFT substrate 10 includes an opening 120 formed in the transmissive region Tr.

The second interlayer insulating layer 14 is a transparent insulating layer provided to cover the reflective layer 12.

The pixel electrode 11 is provided on the second interlayer insulating layer 14. Thus, the pixel electrode 11 is disposed on the reflective layer 12 with the transparent insulating layer 14 interposed therebetween. The pixel electrode 11 is formed from a transparent conductive material. As the transparent conductive material, for example, indium tin oxide (ITO), indium zinc oxide (IZO (trade name)), or a mixture thereof can be used. The pixel electrode 11 is electrically connected to a backplane circuit including a memory circuit. A portion of the pixel electrode 11 is located in the transmissive region Tr, and a portion of the pixel electrode 11 is located in the reflective region Rf.

The contact portion CP electrically connects the pixel electrode 11 and the backplane circuit in a first contact hole CH1 formed in the first interlayer insulating layer 13 and a second contact hole CH2 formed in the second interlayer insulating layer 14. In the illustrated example, the contact portion CP includes a first contact electrode 16, a second contact electrode 17, and a third contact electrode 18.

The first contact electrode 16 is an electrode (or a portion of wiring line) exposed in the first contact hole CH1. The second contact electrode 17 is formed on the first interlayer insulating layer 13 and in the first contact hole CH1, and is connected to the first contact electrode 16 in the first contact hole CH1. The second contact electrode 17 is partially exposed in the second contact hole CH2. In the second contact hole CH2, the third contact electrode 18 is connected to the second contact electrode 17 and the pixel electrode 11. In other words, the third contact electrode 18 is interposed between the second contact electrode 17 and the pixel electrode 11. In the illustrated example, the conductive layer 19 formed from the same conductive film as the second contact electrode 17 (that is, in the same layer as the second contact electrode 17) is interposed between the reflective layer 12 and the first interlayer insulating layer 13. The third contact electrode 18 is formed from the same metal film as the reflective layer 12 (that is, in the same layer as the reflective layer 12). The conductive layer 19 and the third contact electrode 18 may be omitted.

The counter substrate 20 includes a counter electrode (common electrode) 21 and a second alignment film 25. The counter substrate 20 further includes a color filter layer and a plurality of columnar spacers (both not illustrated). The constituent elements of the counter substrate 20 (the counter electrode 21 and the like described above) are supported by a substrate 20*a*. The substrate 20*a* is, for example, a glass substrate or a plastic substrate. Note that the counter substrate 20 does not have a black matrix (light-shielding layer) between any two pixels P adjacent to each other.

The counter electrode 21 is provided to face the pixel electrode 11 and the reflective electrode 12. The counter electrode 21 is formed from a transparent conductive material. A material similar to that of the pixel electrode 11 can be used as the transparent conductive material for forming the counter electrode 21.

The color filter layer typically includes a red color filter provided in a region corresponding to the red pixel PR, a green color filter provided in a region corresponding to the green pixel PG, and a blue color filter provided in a region corresponding to the blue pixel PB. The red color filter, green color filter, and blue color filter transmit red light, green light, and blue light, respectively.

The columnar spacer defines the thickness (cell gap) of the liquid crystal layer 30. The columnar spacers can include a photosensitive resin.

The liquid crystal layer 30 is formed from a negative (that is, dielectric anisotropy is negative) liquid crystal material. Here, a chiral agent is added to the liquid crystal material. The liquid crystal layer 30 can be formed, for example, by the falling drop method.

The first alignment film 15 and the second alignment film 25 are each provided to be in contact with the liquid crystal layer 30. Here, each of the first alignment film 15 and the second alignment film 25 is a vertical alignment film. At least one of the first alignment film 15 or the second alignment film 25 is subjected to alignment processing (for example, rubbing processing) and defines a pretilt azimuth.

Liquid crystal molecules 31 of the liquid crystal layer 30 are vertically aligned in a state where no voltage is applied to the liquid crystal layer 30 (see FIG. 4A), and tilt to be in a twist alignment when a predetermined voltage is applied to the liquid crystal layer 30. The liquid crystal layer 30 is a vertical alignment liquid crystal layer as described above.

In the illustrated example, a thickness (cell gap) dt of the liquid crystal layer 30 in the transmissive region Tr and a thickness (cell gap) dr of the liquid crystal layer 30 in the reflective region Rf are substantially the same.

The liquid crystal display device 100 has a configuration for performing gray scale display with the memory liquid crystal. Specifically, each pixel P in the liquid crystal display device 100 is divided into a plurality of unit pixels (subpixels) Up, as illustrated in FIGS. 2 and 3. Here, one pixel P is divided into three unit pixels Up, and the pixel electrode 11 is divided into three unit pixel electrodes (subpixel electrodes) 11*a*. Of the three unit pixel electrodes 11*a*, the two unit pixel electrodes 11*a* disposed on the upper side and the lower side in the drawing are electrically connected to a single common memory circuit, and one unit pixel electrode 11*a* disposed at the center of the diagram is electrically connected to another memory circuit. In other words, two memory circuits are provided for each pixel P.

Figure 5:
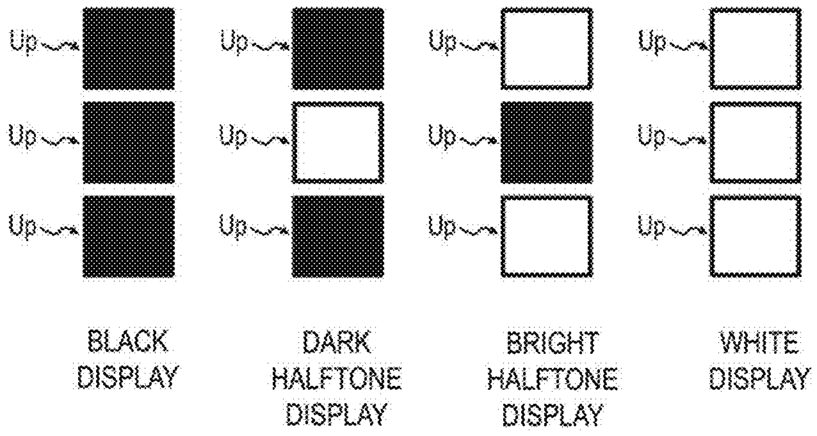
FIG. 5 is a view illustrating an example of gray scale display using the configurations illustrated in FIGS. 2 and 3.

With the pixel P divided as illustrated in FIGS. 2 and 3, four gray scale display may be implemented by an area gradation method as illustrated in FIG. 5. Specifically, as illustrated on the leftmost part in FIG. 5, by setting all three unit pixels Up to the black display state, the entire pixel P can be displayed in black. As illustrated second from the left in FIG. 5, by setting two unit pixels Up to the black display state and one unit pixel Up to the white display state, a dark halftone display can be performed for the entire pixel P. As illustrated third from the left in FIG. 5, by setting two unit pixels Up to the white display state and one unit pixel Up to the black display state, a bright halftone display can be performed for the entire pixel P. As illustrated on the rightmost part in FIG. 5, by setting all three unit pixels Up to the white display state, the entire pixel P can be displayed in white.

Note that the three unit pixel electrodes 11*a* may be electrically connected respectively to different memory circuits (that is, three memory circuits may be provided for each pixel P).

Next, a relationship between the direction (reference alignment direction) RD of the director of the liquid crystal domain and an arrangement of the transmissive region Tr in the unit pixel Up will be described with reference to FIGS. 6 and 7.

Figure 6:
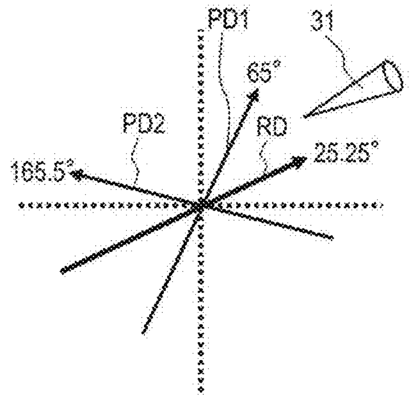
FIG. 6 is a view illustrating a pretilt azimuth PD1 by a first alignment film 15, a pretilt azimuth PD2 by a second alignment film 25, and a reference alignment direction RD in the liquid crystal display device 100.

FIG. 6 illustrates a pretilt azimuth PD1 defined by the first alignment film 15 provided in the TFT substrate 10, a pretilt azimuth PD2 defined by the second alignment film 25 provided in the counter substrate 20, and the direction (reference alignment direction) RD of the director of the liquid crystal domain. Here, the pretilt azimuth PD1 by the first alignment film 15 is a 65° direction, the pretilt azimuth PD2 by the second alignment film 25 is a 165.5° direction, and the reference alignment direction RD is a 25.25° direction.

Figure 7:
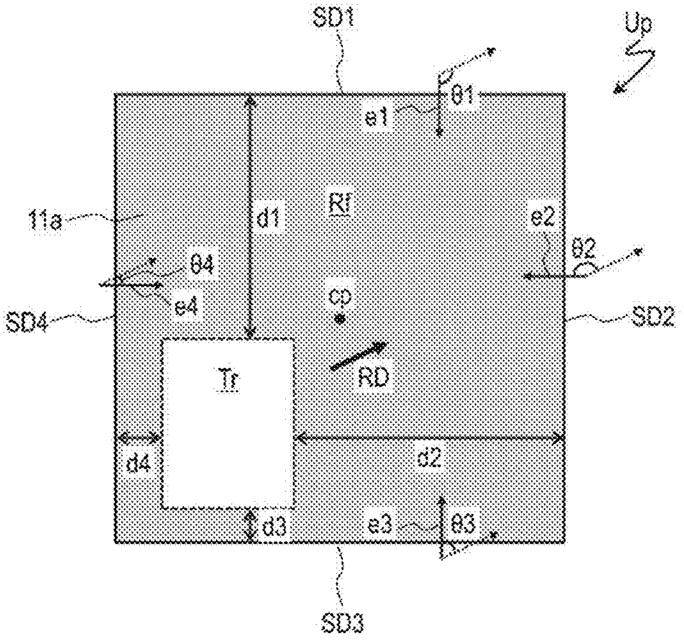
FIG. 7 is a view for describing an arrangement of a transmissive region Tr in a unit pixel Up.

FIG. 7 is a view for describing the arrangement of the transmissive region Tr in the unit pixel Up. In the liquid crystal display device 100 of the present embodiment, as illustrated in FIG. 7, in the unit pixel Up, the transmissive region Tr is disposed to be shifted to a side opposite to the reference alignment direction RD with respect to a center cp of the unit pixel Up. Thus, flickers when the transmissive display is observed from an oblique direction are suppressed. The reasons for this will be described below.

As illustrated in FIG. 7, outer edges of the unit pixel electrode 11*a* include four electrode sides SD1, SD2, SD3 and SD4. In FIG. 7, four directions e1, e2, e3, and e4 orthogonal to the electrode sides SD1, SD2, SD3, and SD4, respectively, and directed toward the inside of the unit pixel electrode 11*a* are indicated. In the present specification, the electrode sides SD1 to SD4 are classified into two types of electrode sides of a "first electrode side" and a "second electrode side" depending on magnitudes of angles formed by the directions e1 to e4 and the reference alignment direction RD. That is, it can be said that the outer edges of the unit pixel electrode 11*a* include at least one "first electrode side" and at least one "second electrode side".

A direction orthogonal to the "first electrode side" and directed toward the inside of the unit pixel electrode 11*a* forms an angle of more than 90° with the reference alignment direction RD. On the other hand, a direction orthogonal to the "second electrode side" and directed toward the inside of the unit pixel electrode 11*a* forms an angle of less than 90° with the reference alignment direction.

The electrode side (referred to as "upper electrode side") SD1 located at an upper end of the unit pixel electrode 11*a* extends in a display surface horizontal direction (in the left-right direction in FIG. 7), and thus the direction e1 is a 270° direction. Thus, an angle θ1 formed by the direction e1 and the reference alignment direction RD is 115.25°. Thus, the upper electrode side SD1 is the first electrode side.

The electrode side (referred to as "right electrode side") SD2 located at a right end of the unit pixel electrodes 11*a* extends in a display surface vertical direction (up-down direction in FIG. 7), and thus the direction e2 is a 180° direction. Thus, an angle θ2 formed by the direction e2 and the reference alignment direction RD is 154.75°. Thus, the right electrode side SD2 is the first electrode side.

The electrode side (referred to as "lower electrode side") SD3 located at a lower end of the unit pixel electrode 11*a* extends in a display surface horizontal direction (in the left-right direction in FIG. 7), and thus the direction e3 is a 90° direction. Thus, an angle θ3 formed by the direction e3 and the reference alignment direction RD is 64.75°. Thus, the lower electrode side SD3 is the second electrode side.

The electrode side (referred to as "left electrode side") SD4 located at a left end of the unit pixel electrodes 11*a* extends in a display surface vertical direction (up-down direction in FIG. 7), and thus the direction e4 is a 0° direction. Thus, an angle θ4 formed by the direction e4 and the reference alignment direction RD is 25.25°. Thus, the left electrode side SD4 is the second electrode side.

As described above, the upper electrode side SD1 and the right electrode side SD2 are the first electrode sides, and the lower electrode side SD3 and the left electrode side SD4 are the second electrode sides. When a voltage is applied to the liquid crystal layer 30, disclination lines occur near the first electrode sides. On the other hand, the disclination lines do not occur near the second electrode sides.

Figure 8:
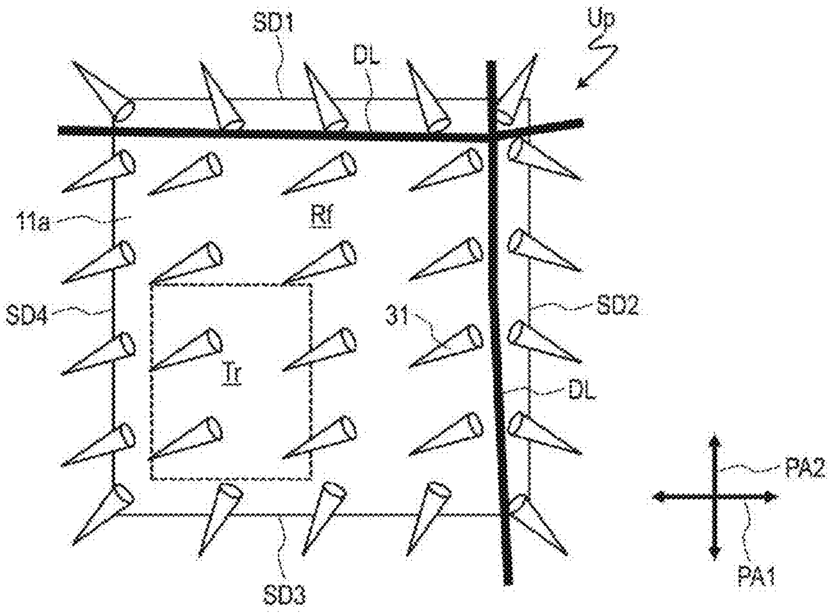
FIG. 8 is a view illustrating an example of disclination lines DL observed in a state where a pair of linear polarizers are provided instead of a pair of circular polarizers 40A and 40B.

The above-described disclination lines are not observed in a state where the liquid crystal display device 100 includes the circular polarizers 40A and 40B, but can be observed in a state where a pair of linear polarizers are provided instead of the circular polarizers 40A and 40B. FIG. 8 illustrates an example of disclination lines DL observed in a state where the pair of linear polarizers are provided. Here, polarization axes PA1 and PA2 of the pair of linear polarizers are parallel to the display surface horizontal direction and the display surface vertical direction, respectively. As illustrated in FIG.

8, the disclination lines DL occur near the upper electrode side SD1 and the right electrode side SD2, whereas the disclination lines DL do not occur near the lower electrode side SD3 and the left electrode side SD4.

Figure 9A:
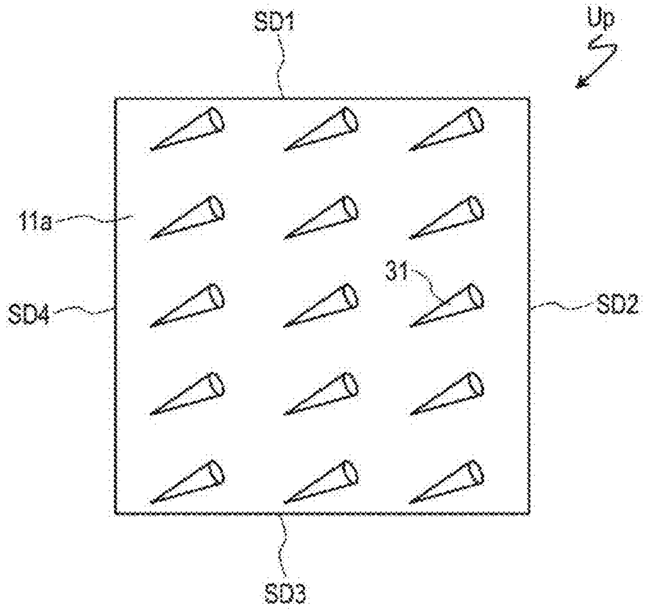
FIG. 9A is a view illustrating alignment directions (tilt directions of liquid crystal molecules 31 near the center of the liquid crystal layer 30 in the thickness direction when a voltage is applied) defined by the first alignment film 15 and the second alignment film 25.
Figure 9B:
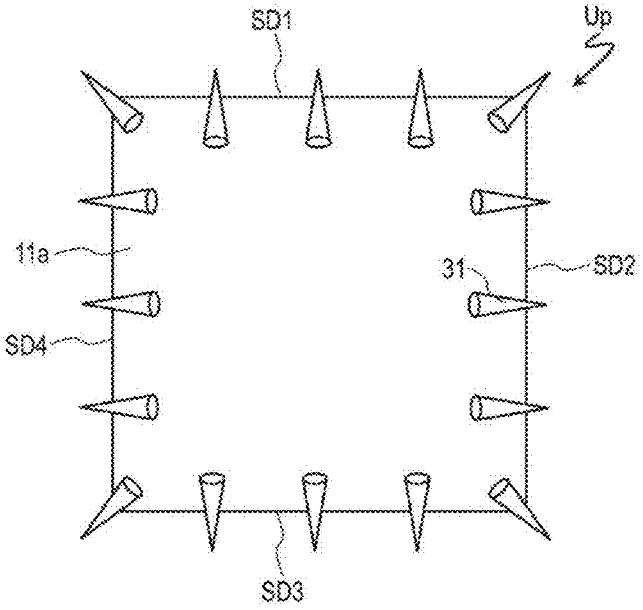
FIG. 9B is a view illustrating alignment directions by oblique electrical fields near outer edges of a unit pixel electrode 11*a*.

FIGS. 9A and 9B are views for describing the cause of the occurrence of the disclination lines DL. FIG. 9A illustrates alignment directions (tilt directions of the liquid crystal molecules 31 near the center of the liquid crystal layer 30 in the thickness direction when a voltage is applied) defined by the first alignment film 15 and the second alignment film 25, and FIG. 9B illustrates alignment directions by oblique electrical fields near the outer edges of the unit pixel electrode 11*a*.

As illustrated in FIG. 9A, alignment directions of the liquid crystal molecules 31 in the pixel P (in the unit pixel Up) are basically controlled by alignment regulating forces of the first alignment film 15 and the second alignment film 25. However, since the liquid crystal molecules 31 near the outer edges of the unit pixel electrode 11*a* are subjected to the alignment regulating forces by the oblique electrical fields generated near the electrode sides SD1 to SD4, the liquid crystal molecules 31 may be in alignment states different from alignment states by the alignment regulating forces of the first alignment film 15 and the second alignment film 25 as illustrated in FIG. 9B. Thus, the alignment states of the liquid crystal molecules 31 in the unit pixel Up are affected by both the alignment regulating forces of the first alignment film 15 and the second alignment film 25 and the alignment regulating forces by the oblique electrical fields near the electrode sides SD1 to SD4. Since a misalignment of the alignment direction is large near the upper electrode side SD1 and the right electrode side SD2, the disclination lines DL occur as illustrated in FIG. 8.

Since different alignment regulating forces compete with each other in a region where the disclination line DL occurs, the alignment direction is likely to change due to a voltage change caused by inversion of the polarity of the voltage applied to the liquid crystal layer 30, a minute difference in an offset voltage between different polarities, or the like. That is, it can be said that the region where the disclination line DL occurs is a region where the alignment is unstable.

In an observation from a front direction in a configuration where the circular polarizers are provided, a change in the alignment direction at a time of polarity inversion is hardly visually recognized optically. However, in an observation from an oblique direction, an apparent retardation and an axis angle of the circular polarizer are different from those in the front direction (that is, an ideal circular polarizer), and thus the change in the alignment direction (instability of a liquid crystal alignment) is visually recognized as flickers.

In the liquid crystal display device 100 of the present embodiment, in the unit pixel Up, the transmissive region Tr is disposed to be shifted to a side opposite to the reference alignment direction RD with respect to the center cp of the unit pixel Up. Thus, as illustrated in FIG. 7, a distance d3 from the lower electrode side SD3 to the transmissive region Tr and a distance d4 from the left electrode side SD4 to the transmissive region Tr are smaller than a distance d1 from the upper electrode side SD1 to the transmissive region Tr and a distance d2 from the right electrode side SD2 to the transmissive region Tr, respectively. That is, the transmissive region Tr is shifted closer to sides of the second electrode sides in the vicinity of which the disclination lines DL do not occur, in other words, the transmissive region Tr is shifted away from the first electrode sides in the vicinity of which the disclination lines DL occur. Thus, flickers when the transmissive display is observed from the oblique direction are suppressed, and the display quality is improved.

Figure 9C:
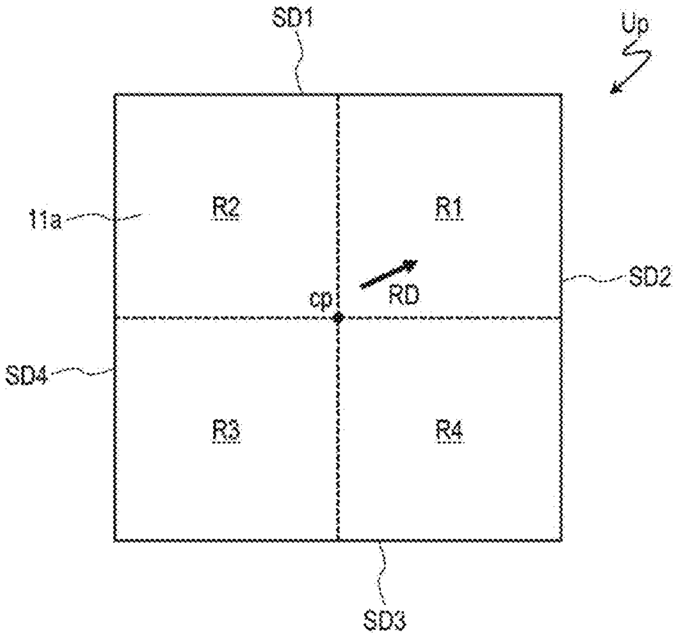
FIG. 9C is a view illustrating four regions R1, R2, R3, and R4 obtained by dividing the unit pixel Up into four.

Here, as illustrated in FIG. 9C, four regions R1, R2, R3, and R4 are considered, in which the four regions R1, R2, R3, and R4 are obtained by dividing the unit pixel Up into two equal parts in the row direction (the display surface horizontal direction and the left-right direction in the drawing) and also by dividing the unit pixel Up into two equal parts in the column direction (the display surface vertical direction and the up-down direction in the drawing). The region R1 including a portion located in a direction from 0° to 90° with respect to the center cp of the unit pixel Up is referred to as a "first quadrant region", and the region R2 including a portion located in a direction from 90° to 180° is referred to as a "second quadrant region". Similarly, the region R3 including a portion located in a direction from 180° to 270° with respect to the center cp of the unit pixel Up is referred to as a "third quadrant region", and the region R4 including a portion located in a direction from 270° to 360° (0°) is referred to as a "fourth quadrant region".

In the example where the reference alignment direction RD is the 25.25° direction, the first quadrant region R1 is a region including two first electrode sides. Each of the second quadrant region R2 and the fourth quadrant region R4 is a region including one first electrode side, and the third quadrant region R3 is a region not including the first electrode side. From the viewpoint of more reliably suppressing flickers, the transmissive region Tr is preferably not included in the first quadrant region R1. Further, the transmissive region Tr is more preferably included only in the second quadrant region R2 and the third quadrant region R3, or only in the third quadrant region R3 and the fourth quadrant region R4, and still more preferably included only in the third quadrant region R3.

In the liquid crystal display device 100 of the present embodiment, the reflective region Rf may include a region in which the disclination line DL occurs. However, the reflective region Rf is larger than the transmissive region Tr, and thus the influence of the change in the alignment direction at the time of the polarity inversion is relatively small, and flickers themselves are relatively hard to be visually recognized in the reflective display, so that it can be said that there is little concern about the deterioration of flickers during the reflective display.

Figure 10:
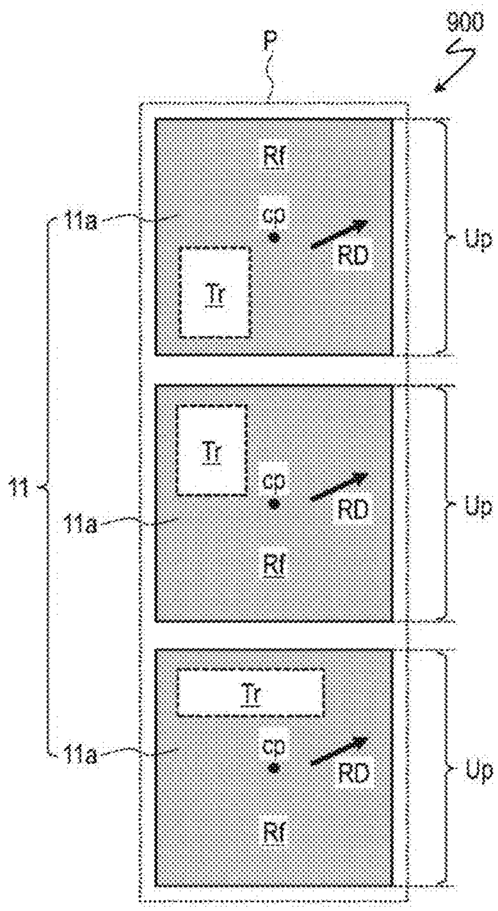
FIG. 10 is a plan view schematically illustrating a liquid crystal display device 900 of a comparative example and illustrates regions corresponding to one pixel P in the liquid crystal display device 900.

FIG. 10 illustrates one pixel P in a liquid crystal display device 900 of a comparative example. The liquid crystal display device 900 of the comparative example differs from the liquid crystal display device 100 of the present embodiment in an arrangement of the transmissive region Tr in the unit pixel Up.

Figure 11:
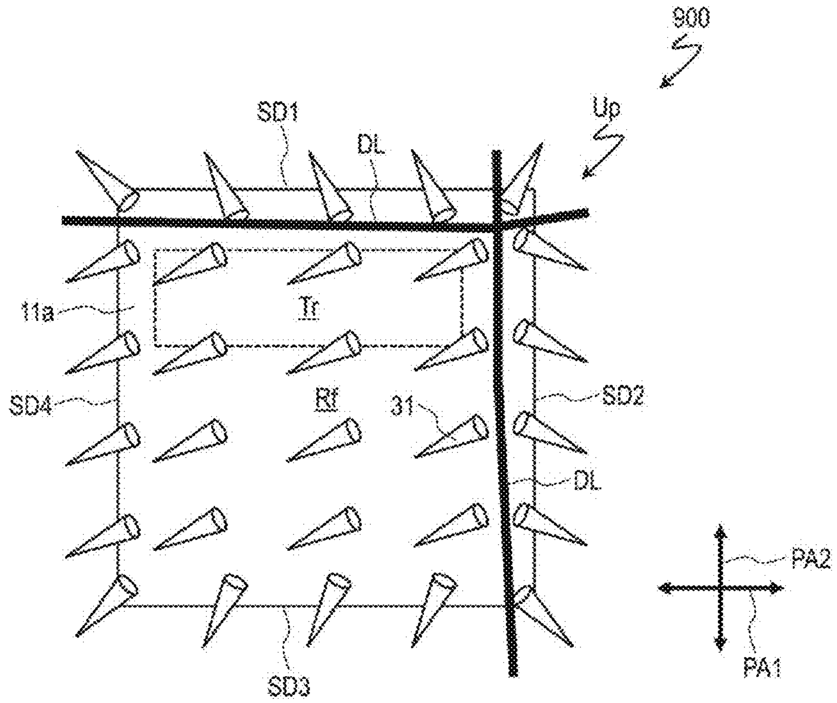
FIG. 11 is a view illustrating an example of disclination lines DL observed in a state where a pair of linear polarizers are provided instead of a pair of circular polarizers 40A and 40B.

In the liquid crystal display device 900 of the comparative example, as a result of simply using a region where a wiring line of the backplane circuit is not provided as the transmissive region Tr, positions of the transmissive regions Tr in the three unit pixels Up are not aligned. As illustrated in FIG. 10, in the unit pixel Up located at the center of the drawing and the unit pixel Up located on the lower side of the drawing, the transmissive region Tr is not disposed to be shifted to a side opposite to the reference alignment direction RD with respect to the center cp of the unit pixel Up. Thus, as illustrated in FIG. 11, the transmissive region Tr may be located near the disclination line DL. Although FIG. 11 illustrates the unit pixel Up located on the lower side in FIG. 10, the same applies to the unit pixel Up located at the center in FIG. 10. When the transmissive region Tr is located near the disclination line DL as described above, flickers may be visually recognized when the transmissive display is observed from the oblique direction.

On the other hand, in the liquid crystal display device 100 of the present embodiment, the transmissive region Tr is disposed to be shifted to a side opposite to the reference alignment direction RD with respect to the center cp of the unit pixel Up, and thus flickers when the transmissive display is observed from the oblique direction is suppressed.

Verification Result of Flicker Suppression Effect

The liquid crystal display device 100 of the present embodiment (example) was manufactured and the results of verifying the effect of improving flickers will be described.

The fabricated liquid crystal display device 100 had a screen size of the 1.2 type, and the size of one pixel P was 126 μm (vertical)×42 μm (horizontal). Of the first alignment film 15 of the TFT substrate 10 and the second alignment film 25 of the counter substrate 20, the rubbing processing was performed as the alignment processing. As described with reference to FIG. 6, the pretilt azimuth PD1 by the first alignment film 15 is the 65° direction, the pretilt azimuth PD2 by the second alignment film 25 is the 165.5° direction, and the direction RD of the director of the liquid crystal domain is the 25.25° direction.

The thickness (cell gap) of the liquid crystal layer 30 was 3 μm in both the transmissive region Tr and the reflective region Rf, and a chiral agent was added to the liquid crystal material of the liquid crystal layer 30 in order to stably and uniquely determine the twist direction. The voltage applied to the liquid crystal layer 30 was set to 0 V during black display and ±3.2 V during white display. The drive frequency was set to 0.5 Hz.

When a microscopic observation was performed using the linear polarizer as the polarizer, the disclination lines DL occurred near the upper electrode side SD1 and near the right electrode side SD2 of the unit pixel electrode 11*a* during white display, and changes in the disclination lines DL and the alignment state in the periphery thereof were visually recognized corresponding to the polarity inversion.

Next, when a microscopic observation was performed using the circular polarizers 40A and 40B as the polarizers, change in the disclination lines DL and the alignment state were not visually recognized near the upper electrode side SD1 and the right electrode side SD2. As can be seen from this, a preferable arrangement of the transmissive region Tr can be determined by performing an alignment observation using the linear polarizer with respect to the liquid crystal display device which originally uses the circular polarizer.

Figure 12:
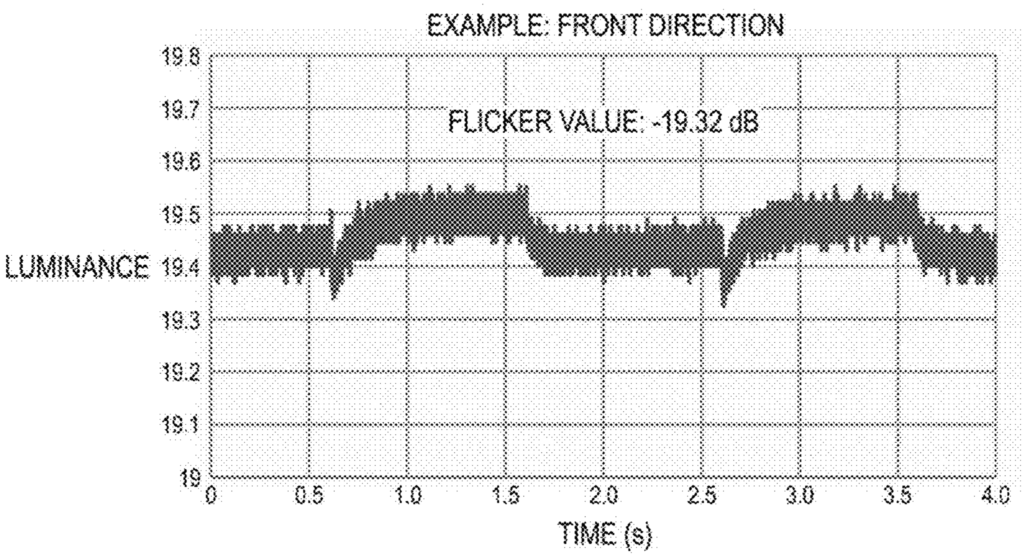
FIG. 12 is a graph showing a change in luminance with respect to time when white display in a transmission mode is observed from a front direction (a polar angle is) 0° in an example.
Figure 13:
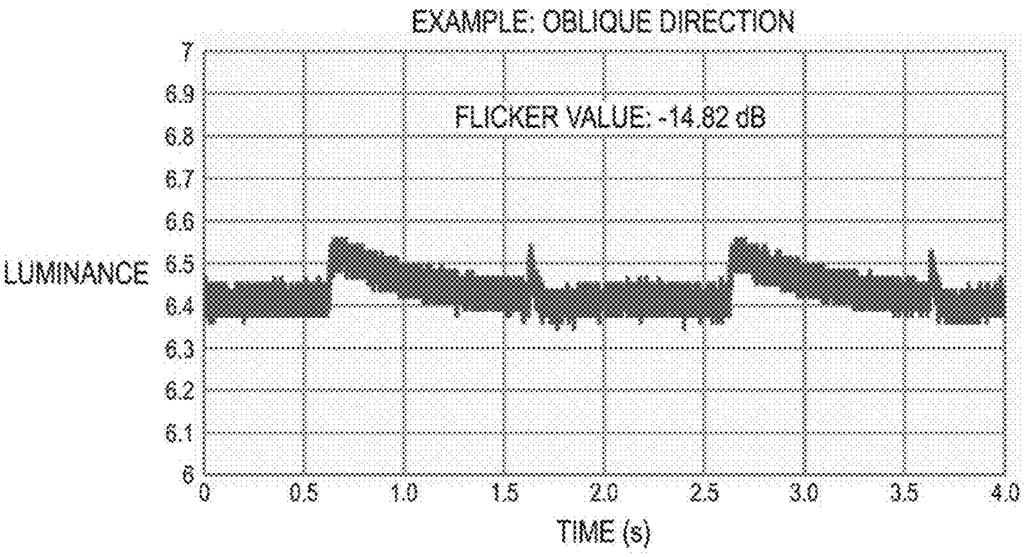
FIG. 13 is a graph showing a change in luminance with respect to time when white display in the transmission mode is observed from an oblique direction (a polar angle is 0° and an azimuth angle is) 225° in an example.

In the example, flickers when the white display in the transmission mode was observed from the front direction (polar angle was 0°) and the oblique direction (polar angle was 60° and azimuth angle was 225°) were measured. The measurement results are shown in FIG. 12 and FIG. 13. FIG. 12 is a graph showing a change in luminance with respect to time when observed from the front direction, and FIG. 13 is a graph showing a change in luminance with respect to time when observed from the oblique direction.

A flicker value in the front direction was −19.32 dB when obtained by a contrast method from the result shown in FIG. 12. Further, a flicker value in the oblique direction was −14.82 dB when obtained by the contrast method from the result shown in FIG. 13. Each of these flicker values was at a level not visually recognized.

Figure 14:
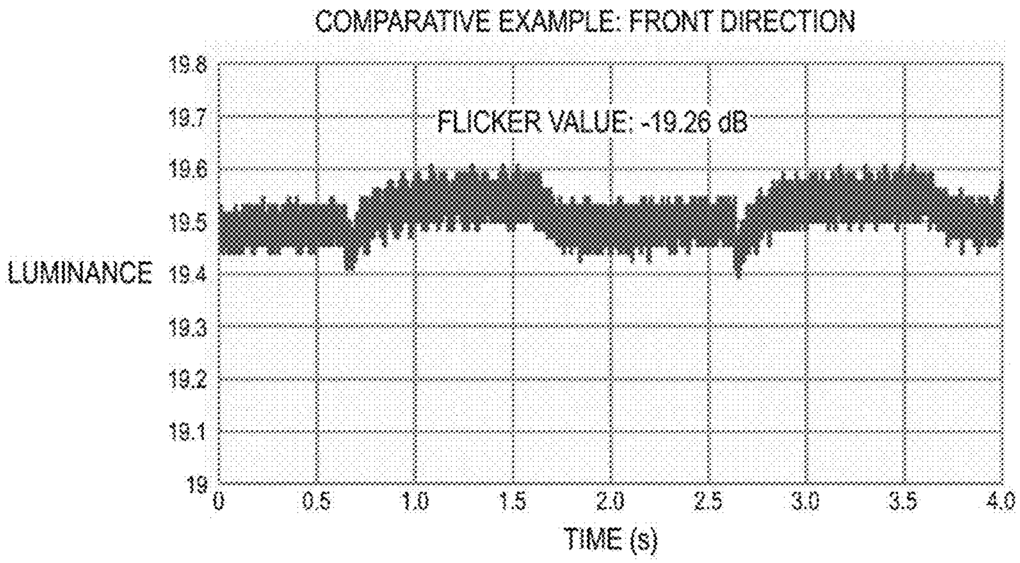
FIG. 14 is a graph showing a change in luminance with respect to time when white display in the transmission mode is observed from the front direction (a polar angle is) 0° in the comparative example.
Figure 15:
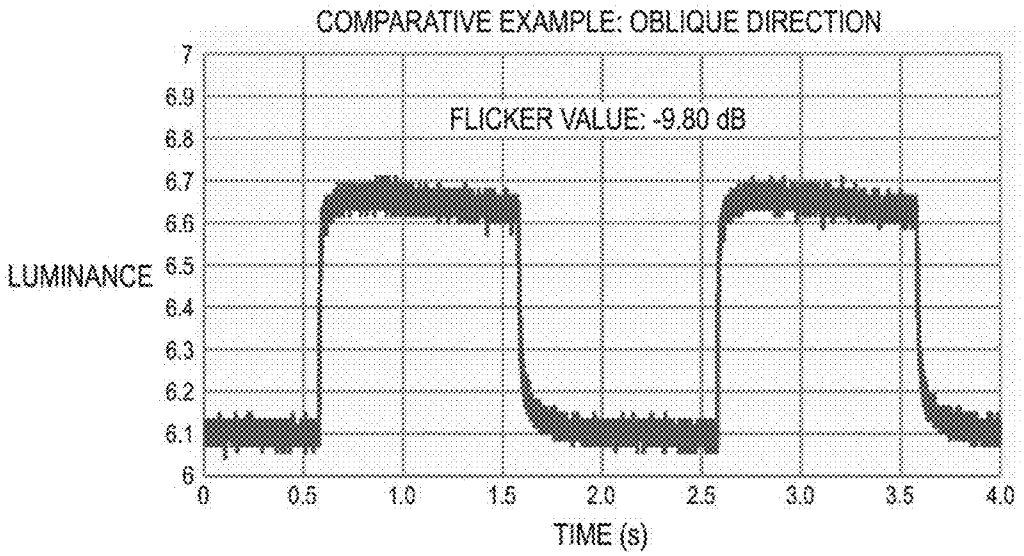
FIG. 15 is a graph showing a change in luminance with respect to time when white display in the transmission mode is observed from the oblique direction (a polar angle is 0° and an azimuth angle is) 225° in the comparative example.

For comparison, the liquid crystal display device 900 of the comparative example was also manufactured and subjected to the same measurement. The measurement results are shown in FIG. 14 and FIG. 15. FIG. 14 is a graph showing a change in luminance with respect to time when observed from the front direction, and FIG. 15 is a graph showing a change in luminance with respect to time when observed from the oblique direction.

A flicker value in the front direction was −19.26 dB, which was at a level not visually recognized, when obtained by the contrast method from the result shown in FIG. 14. However, a flicker value in the oblique direction was −9.80 dB, which was at a level clearly visually recognized, when obtained by the contrast method from the result shown in FIG. 15.

Thus, in the liquid crystal display device 100 of the present embodiment, it was confirmed that the effect of improving flickers was obtained.

The case has been exemplified in the above description in which the reference alignment direction RD is the 25.25° direction, but the reference alignment direction RD is not limited thereto. Each of the electrode sides SD1 to SD4 is determined to correspond to which one of the "first electrode side" or the "second electrode side" depending on which azimuth the reference alignment direction RD is. Thus, the transmissive region Tr may be shifted away from the "first electrode side" and shifted closer to a side of the "second electrode side".

When the reference alignment direction RD is a direction from more than 0° to less than 90°, the upper electrode side SD1 and the right electrode side SD2 are the first electrode sides, and the lower electrode side SD3 and the left electrode side SD4 are the second electrode sides. Thus, the distance d3 from the lower electrode side SD3 to the transmissive region Tr and the distance d4 from the left electrode side SD4 to the transmissive region Tr may be set smaller than the distance d1 from the upper electrode side SD1 to the transmissive region Tr and the distance d2 from the right electrode side SD2 to the transmissive region Tr, respectively.

When the reference alignment direction RD is a direction from more than 90° to less than 180°, the upper electrode side SD1 and the left electrode side SD4 are the first electrode sides, and the right electrode side SD2 and the lower electrode side SD3 are the second electrode sides. Thus, the distance d2 from the right electrode side SD2 to the transmissive region Tr and the distance d3 from the lower electrode side SD3 to the transmissive region Tr may be set smaller than the distance d1 from the upper electrode side SD1 to the transmissive region Tr and the distance d4 from the left electrode side SD4 to the transmissive region Tr, respectively.

When the reference alignment direction RD is a direction from more than 180° to less than 270°, the lower electrode side SD3 and the left electrode side SD4 are the first electrode sides, and the upper electrode side SD1 and the right electrode side SD2 are the second electrode sides. Thus, the distance d1 from the upper electrode side SD1 to the transmissive region Tr and the distance d2 from the right electrode side SD2 to the transmissive region Tr may be set smaller than the distance d3 from the lower electrode side SD3 to the transmissive region Tr and the distance d4 from the left electrode side SD4 to the transmissive region Tr, respectively.

When the reference alignment direction RD is a direction from more than 270° to less than 360°, the right electrode side SD2 and the lower electrode side SD3 are the first electrode sides, and the upper electrode side SD1 and the left electrode side SD4 are the second electrode sides. Thus, the distance d1 from the upper electrode side SD1 to the transmissive region Tr and the distance d4 from the left electrode side SD4 to the transmissive region Tr may be set smaller than the distance d2 from the right electrode side SD2 to the transmissive region Tr and the distance d3 from the lower electrode side SD3 to the transmissive region Tr, respectively.

Note that flickers are easily observed when low-frequency driving is performed. Thus, it can be said that the embodiment of the present disclosure has great significance of being used in the liquid crystal display device in which the low-frequency driving is performed (for example, may be driven at a drive frequency of 30 Hz or less).

Shape of Transmissive Region

Figure 16A:
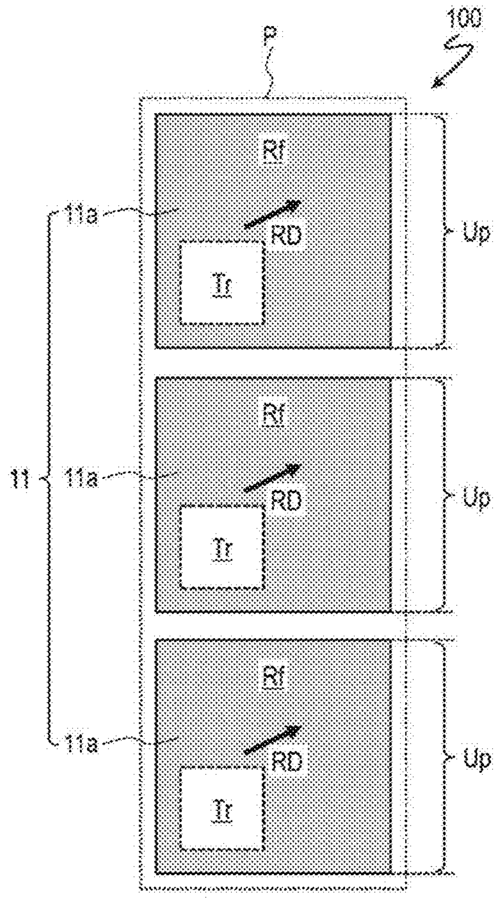
FIG. 16A is a view illustrating an example of a shape of the transmissive region Tr.
Figure 16B:
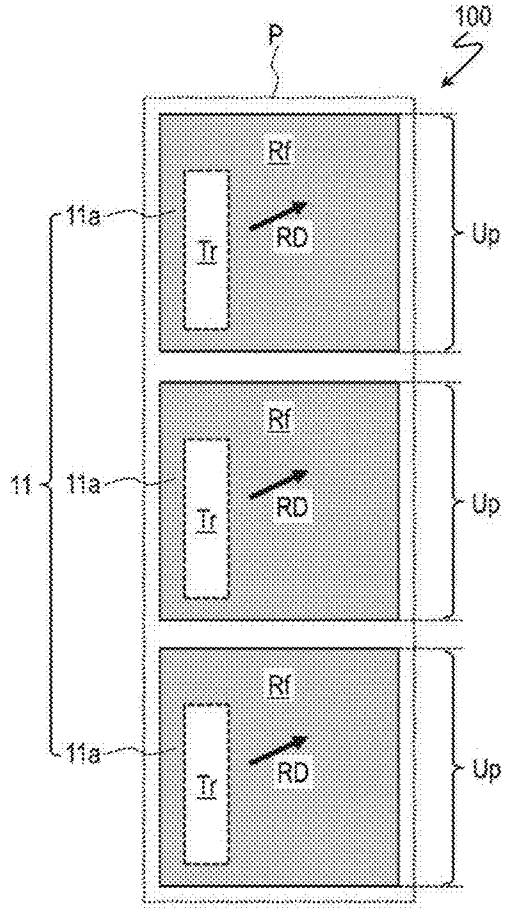
FIG. 16B is a view illustrating an example of a shape of the transmissive region Tr.
Figure 16C:
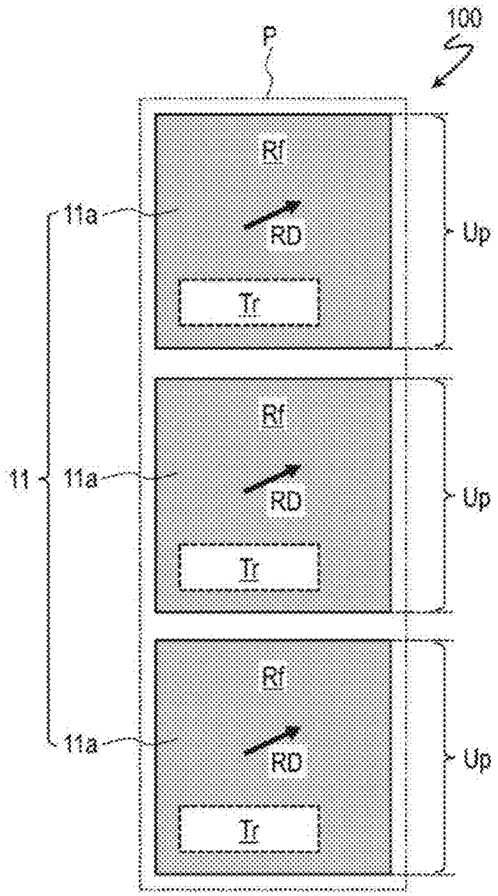
FIG. 16C is a view illustrating an example of a shape of the transmissive region Tr.

The shape of the transmissive region Tr in a plan view is not particularly limited. FIGS. 16A, 16B, and 16C illustrate examples of the shape of the transmissive region Tr.

In any of the examples illustrated in FIGS. 16A, 16B, and 16C, the unit pixel Up has a substantially square shape. In the example illustrated in FIG. 16A, the transmissive region Tr has a substantially square shape. On the other hand, in the example illustrated in FIG. 16B, the transmissive region Tr has a substantially rectangular shape in which a width in a row direction (the display surface horizontal direction and the left-right direction in the drawing) is smaller than a width in a column direction (the display surface vertical direction and the up-down direction in the drawing), and in the example illustrated in FIG. 16C, the transmissive region Tr has a substantially rectangular shape in which a width in a row direction is larger than a width in a column direction.

As the shape of the transmissive region Tr, any of the examples illustrated in FIGS. 16A, 16B, and 16C may be employed. However, from the viewpoint of equally shifting the transmissive region Tr away from the two disclination lines DL occurring near the first electrode sides (here, the upper electrode side SD1 and the right electrode side SD2), it is preferable that the transmissive region Tr has a shape substantially similar to the shape of the unit pixel Up in a plan view as in the example illustrated in FIG. 16A.

Second Embodiment

Figure 17:
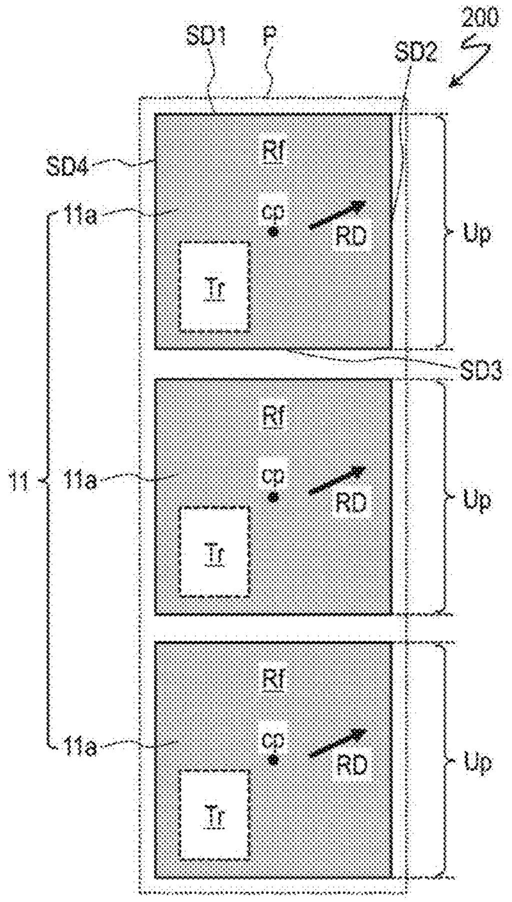
FIG. 17 is a plan view schematically illustrating another liquid crystal display device 200 according to an embodiment of the disclosure and illustrates regions corresponding to one pixel P in the liquid crystal display device 200.
Figure 18:
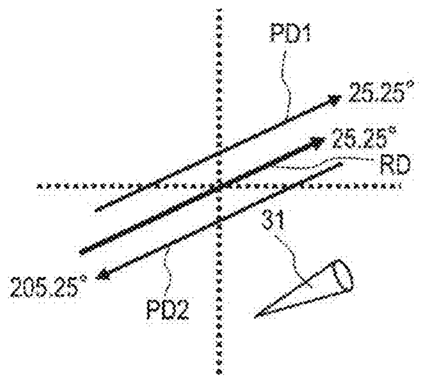
FIG. 18 is a view illustrating a pretilt azimuth PD1 by a first alignment film 15, a pretilt azimuth PD2 by a second alignment film 25, and a reference alignment direction RD in the liquid crystal display device 200.

A liquid crystal display device 200 of the present embodiment will be described with reference to FIGS. 17 and 18. FIG. 17 is a plan view illustrating regions corresponding to one pixel P in the liquid crystal display device 200. FIG. 18 is a view illustrating a pretilt azimuth PD1 defined by the first alignment film 15 provided in the TFT substrate 10, a pretilt azimuth PD2 defined by the second alignment film 25 provided in the counter substrate 20, and the reference alignment direction RD. The following description will primarily focus on differences between the liquid crystal display device 200 of the present embodiment and the liquid crystal display device 100 of the first embodiment.

In the present embodiment, as illustrated in FIG. 18, the pretilt azimuth PD2 by the second alignment film 25 is antiparallel to the pretilt azimuth PD1 by the first alignment film 15. Specifically, the pretilt azimuth PD1 by the first alignment film 15 is a 25.25° direction, the pretilt azimuth PD2 by the second alignment film 25 is a 205.25° direction, and the reference alignment direction RD is the 25.25° direction similarly to the liquid crystal display device 100 of the first embodiment. A chiral agent is not added to the liquid crystal material, and the liquid crystal layer 30 does not have a twist alignment when a voltage is applied and when a voltage is not applied.

Also in the liquid crystal display device 200 of the present embodiment, as illustrated in FIG. 17, in the unit pixel Up, the transmissive region Tr is disposed to be shifted to a side opposite to the reference alignment direction RD with respect to the center cp of the unit pixel Up. Thus, the transmissive region Tr is shifted closer to sides of the second electrode sides (the lower electrode side SD3 and the left electrode side SD4) in the vicinity of which the disclination lines DL do not occur, and is shifted away from the first electrode sides (the upper electrode side SD1 and the right electrode side SD2) in the vicinity of which the disclination lines DL occur. Thus, flickers when the transmissive display is observed from the oblique direction is suppressed.

In the liquid crystal display device 200 of the present embodiment, the cell gap dt of the transmissive region Tr and the cell gap dr of the reflective region Rf may be substantially the same, as in the liquid crystal display device 100 of the first embodiment. Further, the cell gap dt of the transmissive region Tr may be larger than the cell gap dr of the reflective region Rf unlike the liquid crystal display device 100 of the first embodiment.

A cell gap in at least one of the red pixel PR, the green pixel Pc, or the blue pixel PB may be different from a cell gap in at least one of the others. When the cell gap of the red pixel PR, the cell gap of the green pixel PG, and the cell gap of the blue pixel PB are denoted by "$d_R$,", "$d_G$", and "$d_B$", respectively, for example, $d_R>d_G=d_B$, $d_R=d_G>d_B$, or $d_R>d_G>d_B$ may be satisfied.

Third Embodiment

Figure 19:
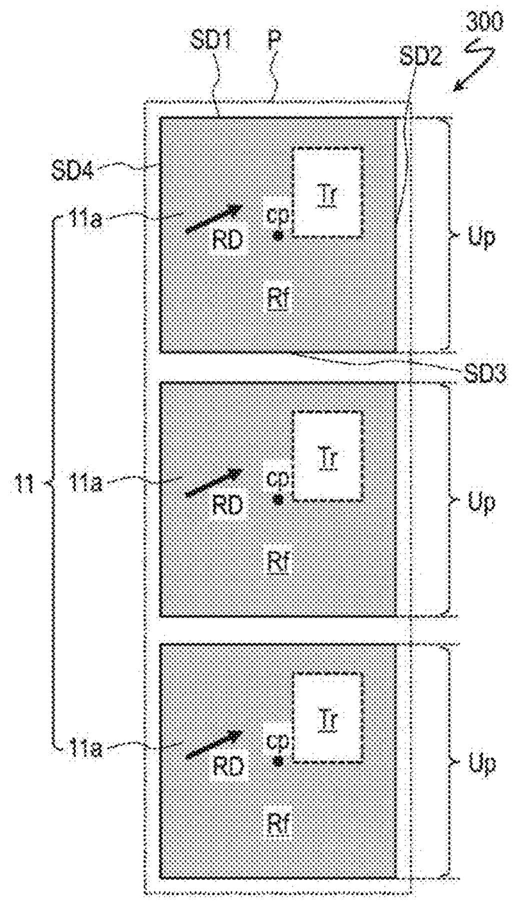
FIG. 19 is a plan view schematically illustrating yet another liquid crystal display device 300 according to an embodiment of the disclosure and illustrates regions corresponding to one pixel P in the liquid crystal display device 300.
Figure 20:
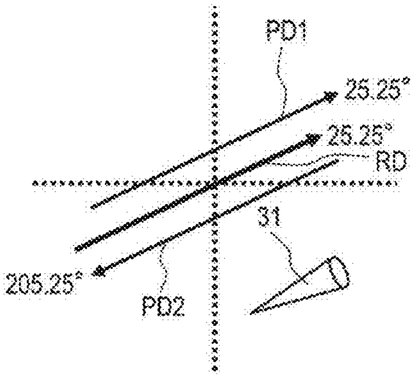
FIG. 20 is a view illustrating a pretilt azimuth PD1 by a first alignment film 15, a pretilt azimuth PD2 by a second alignment film 25, and a reference alignment direction RD in the liquid crystal display device 300.

A liquid crystal display device 300 of the present embodiment will be described with reference to FIGS. 19 and 20. FIG. 19 is a plan view illustrating regions corresponding to one pixel P in the liquid crystal display device 300. FIG. 20 is a view illustrating a pretilt azimuth PD1 defined by the first alignment film 15 provided in the TFT substrate 10, a pretilt azimuth PD2 defined by the second alignment film 25 provided in the counter substrate 20, and the reference alignment direction RD. The following description will primarily focus on differences between the liquid crystal display device 300 of the present embodiment and the liquid crystal display device 100 of the first embodiment.

In the liquid crystal display device 300 of the present embodiment, the liquid crystal layer 30 is formed from a positive (that is, dielectric anisotropy is positive) liquid crystal material. Each of the first alignment film 15 and the second alignment film 25 is a horizontal alignment film. The liquid crystal layer 30 is a horizontal alignment liquid crystal layer as described above.

In the present embodiment, as illustrated in FIG. 20, the pretilt azimuth PD2 by the second alignment film 25 is antiparallel to the pretilt azimuth PD1 by the first alignment film 15. Specifically, the pretilt azimuth PD1 by the first alignment film 15 is a 25.25° direction, the pretilt azimuth PD2 by the second alignment film 25 is a 205.25° direction, and the reference alignment direction RD is the 25.25° direction similarly to the liquid crystal display device 100 of the first embodiment.

Figure 21:
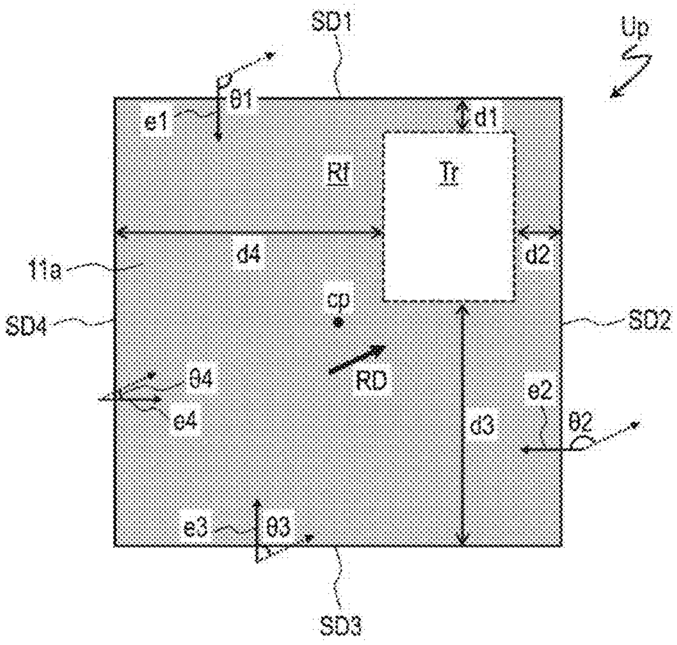
FIG. 21 is a view for describing an arrangement of a transmissive region Tr in a unit pixel Up.

In the liquid crystal display device 300 of the present embodiment, as illustrated in FIG. 19, in the unit pixel Up, the transmissive region Tr is disposed to be shifted to the reference alignment direction RD side with respect to the center cp of the unit pixel Up. Thus, as illustrated in FIG. 21, the distance d1 from the upper electrode side SD1 to the transmissive region Tr and the distance d2 from the right electrode side SD2 to the transmissive region Tr are smaller than the distance d3 from the lower electrode side SD3 to the transmissive region Tr and the distance d4 from the left electrode side SD4 to the transmissive region Tr, respectively.

Figure 22:
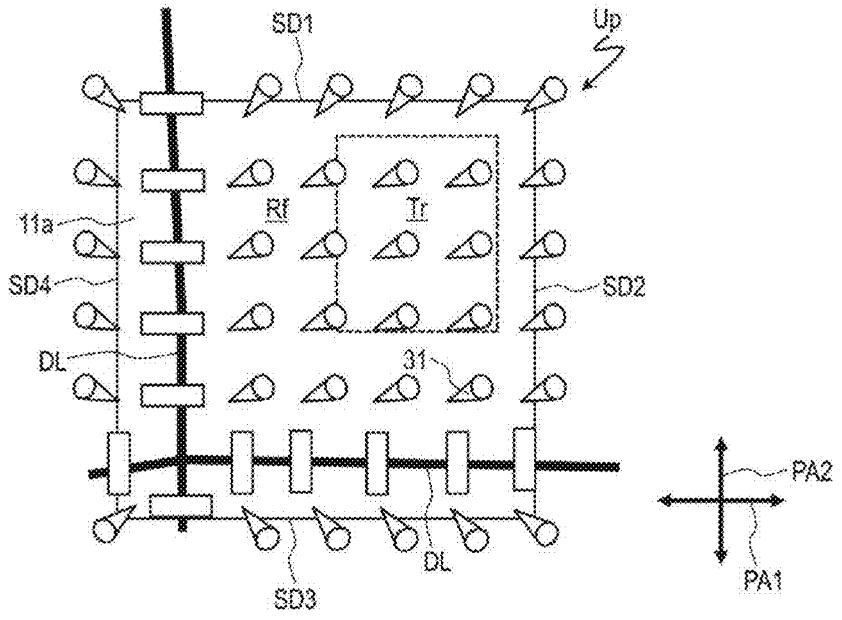
FIG. 22 is a view illustrating an example of disclination lines DL observed in a state where a pair of linear polarizers are provided instead of the pair of circular polarizers 40A and 40B.

In the present embodiment, since the liquid crystal layer 30 is formed of the positive liquid crystal material, the alignment direction by the oblique electrical field near the outer edge of the unit pixel electrode 11*a* is opposite to that in the case where the liquid crystal layer 30 is formed of the negative liquid crystal material. Thus, as illustrated in FIG. 22, the disclination lines DL occur near the lower electrode side SD3 and the left electrode side SD4, which are the second electrode sides, whereas the disclination lines DL do not occur near the upper electrode side SD1 and the right electrode side SD2, which are the first electrode sides. As described above, the transmissive region Tr is disposed to be shifted to the reference alignment direction RD side with respect to the center cp of the unit pixel Up. Thus, the transmissive region Tr is shifted closer to sides of the first electrode sides (the upper electrode side SD1 and the right electrode side SD2) in the vicinity of which the disclination lines DL do not occur, and is shifted away from the second electrode side (the lower electrode side SD3 and the left electrode side SD4) in the vicinity of which the disclination lines DL occur. Thus, flickers when the transmissive display is observed from the oblique direction is suppressed.

Here, considering the four regions R1, R2, R3 and R4 illustrated in FIG. 9C, in the example where the reference alignment direction RD is the 25.25° direction, the third quadrant region R3 is a region including two second electrode sides. Each of the second quadrant region R2 and the fourth quadrant region R4 is a region including one second electrode side, and the first quadrant region R1 is a region not including the second electrode side. From the viewpoint of more reliably suppressing flickers, the transmissive region Tr is preferably not included in the third quadrant region R3. Further, the transmissive region Tr is more preferably included only in the first quadrant region R1 and the second quadrant region R2 or included only in the first quadrant region R1 and the fourth quadrant region R4, and still more preferably included only in the first quadrant region R1.

Also in the present embodiment, the case has been exemplified in which the reference alignment direction RD is the 25.25° direction, but the reference alignment direction RD is not limited thereto. Each of the electrode sides SD1 to SD4 is determined to correspond to which one of the "first electrode side" or the "second electrode side" depending on which azimuth the reference alignment direction RD is. Thus, the transmissive region Tr may be shifted away from the "second electrode side" and shifted closer to a side of the "first electrode side".

When the reference alignment direction RD is a direction from more than 0° to less than 90°, the upper electrode side SD1 and the right electrode side SD2 are the first electrode sides, and the lower electrode side SD3 and the left electrode side SD4 are the second electrode sides. Thus, the distance d1 from the upper electrode side SD1 to the transmissive region Tr and the distance d2 from the right electrode side SD2 to the transmissive region Tr may be set smaller than the distance d3 from the lower electrode side SD3 to the transmissive region Tr and the distance d4 from the left electrode side SD4 to the transmissive region Tr, respectively.

When the reference alignment direction RD is a direction from more than 90° to less than 180°, the upper electrode side SD1 and the left electrode side SD4 are the first electrode sides, and the right electrode side SD2 and the lower electrode side SD3 are the second electrode sides. Thus, the distance d1 from the upper electrode side SD1 to the transmissive region Tr and the distance d4 from the left electrode side SD4 to the transmissive region Tr may be set smaller than the distance d2 from the right electrode side SD2 to the transmissive region Tr and the distance d3 from the lower electrode side SD3 to the transmissive region Tr, respectively.

When the reference alignment direction RD is a direction from more than 180° to less than 270°, the lower electrode side SD3 and the left electrode side SD4 are the first electrode sides, and the upper electrode side SD1 and the right electrode side SD2 are the second electrode sides. Thus, the distance d3 from the lower electrode side SD3 to the transmissive region Tr and the distance d4 from the left electrode side SD4 to the transmissive region Tr may be set smaller than the distance d1 from the upper electrode side SD1 to the transmissive region Tr and the distance d2 from the right electrode side SD2 to the transmissive region Tr, respectively.

When the reference alignment direction RD is a direction from more than 270° to less than 360°, the right electrode side SD2 and the lower electrode side SD3 are the first electrode sides, and the upper electrode side SD1 and the left electrode side SD4 are the second electrode sides. Thus, the distance d2 from the right electrode side SD2 to the transmissive region Tr and the distance d3 from the lower electrode side SD3 to the transmissive region Tr may be set smaller than the distance d1 from the upper electrode side SD1 to the transmissive region Tr and the distance d4 from the left electrode side SD4 to the transmissive region Tr, respectively.

Also in the liquid crystal display device 300 of this embodiment, the shape of the transmissive region Tr in a plan view is not particularly limited. However, from the viewpoint of equally shifting the transmissive region Tr away from the two disclination lines DL occurring near the second electrode sides, it is preferable that the transmissive region Tr has a shape substantially geometrically similar to the shape of the unit pixel Up in a plan view.

Other Aspects

Here, a backplane circuit having a memory circuit for each pixel P is described, but the backplane circuit is not limited to this example. The backplane circuit may include a TFT connected to the pixel electrode 11, and a gate bus line, a source bus line, and the like connected to the TFT, as in a typical active matrix substrate. The TFT is, for example, a TFT having an oxide semiconductor layer including an amorphous silicon layer, a polysilicon layer, or an In—Ga—Zn—O-based semiconductor (see JP 2014-007399 A) as an active layer. JP 2014-007399 A is incorporated herein by reference.

In addition, the configuration has been exemplified in which each pixel P includes the plurality of unit pixels Up, but each pixel P may include one unit pixel Up. In this case, the entirety of the pixel electrode 11 is one unit pixel electrode 11*a*.

INDUSTRIAL APPLICABILITY

The embodiments of the present disclosure can be broadly applied to a liquid crystal display device (that is, a transflective liquid crystal display device) in which each pixel includes a reflective region for performing display in a reflection mode, and a transmissive region for performing display in a transmission mode.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A liquid crystal display device comprising:

a first substrate;

a second substrate facing the first substrate;

a liquid crystal layer provided between the first substrate and the second substrate;

a pair of circular polarizers facing each other with at least the liquid crystal layer interposed therebetween, and a plurality of pixels arranged in a matrix, wherein the first substrate includes a pixel electrode provided in each of the plurality of pixels, the liquid crystal layer has a monodomain alignment in which at least one liquid crystal domain of one type is formed in each of the plurality of pixels when a voltage is applied to the liquid crystal layer, the pixel electrode includes at least one unit pixel electrode on which the liquid crystal domain is formed, each of the plurality of pixels includes at least one unit pixel that is a region corresponding to the at least one unit pixel electrode, the unit pixel includes a reflective region configured to perform display in a reflection mode and a transmissive region configured to perform display in a transmission mode and having an area smaller than an area of the reflective region in a plan view, and an outer edge of the unit pixel electrode includes at least one first electrode side and at least one second electrode side, when a direction of a director of the liquid crystal domain is referred to as a reference alignment direction, a direction orthogonal to the first electrode side and directed toward the inside of the unit pixel electrode forms an angle of more than 90° with the reference alignment direction, a direction orthogonal to the second electrode side and directed toward the inside of the unit pixel electrode forms an angle of less than 90° with the reference alignment direction, and the liquid crystal layer is made of a negative liquid crystal material, and in the unit pixel, a distance from the second electrode side to the transmissive region is smaller than a distance from the first electrode side to the transmissive region, or the liquid crystal layer is made of a positive liquid crystal material, and in the unit pixel, a distance from the first electrode side to the transmissive region is smaller than a distance from the second electrode side to the transmissive region.

2. A liquid crystal display device comprising:

a first substrate;

a second substrate facing the first substrate;

a liquid crystal layer provided between the first substrate and the second substrate;

a pair of circular polarizers facing each other with at least the liquid crystal layer interposed therebetween, and a plurality of pixels arranged in a matrix, wherein the first substrate includes a pixel electrode provided in each of the plurality of pixels, the liquid crystal layer has a monodomain alignment in which at least one liquid crystal domain of one type is formed in each of the plurality of pixels when a voltage is applied to the liquid crystal layer, the pixel electrode includes at least one unit pixel electrode on which the liquid crystal domain is formed, each of the plurality of pixels includes at least one unit pixel that is a region corresponding to the at least one unit pixel electrode, and the unit pixel includes a reflective region configured to perform display in a reflection mode and a transmissive region configured to perform display in a transmission mode and having an area smaller than an area of the reflective region in a plan view, when a direction of a director of the liquid crystal domain is referred to as a reference alignment direction, the liquid crystal layer is made of a negative liquid crystal material, and in the unit pixel, the transmissive region is disposed to be shifted to a side opposite to the reference alignment direction with respect to a center of the unit pixel, or the liquid crystal layer is made of a positive liquid crystal material, and in the unit pixel, the transmissive region is disposed to be shifted to a side of the reference alignment direction with respect to a center of the unit pixel.

3. The liquid crystal display device according to claim 1, wherein the liquid crystal display device is driven at a drive frequency of 30 Hz or less.

4. The liquid crystal display device according to claim 1, wherein a thickness of the liquid crystal layer in the reflective region and a thickness of the liquid crystal layer in the transmissive region are substantially the same in each of the plurality of pixels.

5. The liquid crystal display device according to claim 1, wherein the liquid crystal layer does not have a twist alignment, and a thickness of the liquid crystal layer in the transmissive region is larger than a thickness of the liquid crystal layer in the reflective region in each of the plurality of pixels.

6. The liquid crystal display device according to claim 5, wherein the plurality of pixels include a red pixel that displays red, a green pixel that displays green, and a blue pixel that displays blue, and a thickness of the liquid crystal layer in at least one of the red pixel, the green pixel, or the blue pixel is different from a thickness of the liquid crystal layer in at least one of the others.

7. The liquid crystal display device according to claim 1, further comprising:

memory circuits connected to the plurality of pixels, respectively.

8. The liquid crystal display device according to claim 1, wherein the transmissive region has a shape substantially similar to a shape of the unit pixel in a plan view in each of the at least one unit pixel.

* * * * *